UNITED STATES PATENT OFFICE.

WALTER HUNT, OF NEW YORK, N. Y., ASSIGNOR, BY MESNE ASSIGNMENTS, TO THE UNION PAPER-COLLAR COMPANY, OF SAME PLACE.

IMPROVEMENT IN SHIRT-COLLARS.

Specification forming part of Letters Patent No. 11,376, dated July 25, 1854; reissue No. 1,828, dated November 29, 1864; extended seven years; reissue No. 5,109, dated October 22, 1872.

*To all whom it may concern:*

Be it known that we, the UNION PAPER-COLLAR COMPANY, of New York, are the owners of the reissued patent No. 1,828, granted to Wm. E. Lockwood, assignee, by mesne assignments, of WALTER HUNT, in place of the original Letters Patent granted to the said WALTER HUNT on the 25th day of July, 1854, for an Improvement in Shirt-Collars; and we do hereby declare the following to be a full, clear, and exact description of the said invention, which consists—

First, of a shirt-collar composed of paper and muslin, or its equivalent, so combined that the muslin will counteract the fragile character of the paper, prevent the tearing and breaking of the collar at the parts subjected to the greatest strain; and, secondly, of a shirt-collar composed of paper and muslin, or its equivalent, so combined and so polished or burnished that the collar shall have the whiteness and brilliancy of the most carefully-dressed linen-collar, for which the improved collar forms a cheap substitute.

In carrying out his invention, the said HUNT united thin white paper to muslin by paste, glue, or other appropriate sizing, preferring to secure one sheet of paper to one side and another to the opposite side of the said muslin or other textile fabric or fibrous material not readily torn. The fabric was polished and rendered more stiff and elastic by subjecting it to the action of calendar-rolls, rubbing with an agate burnisher or other means. The collars or other articles of wearing apparel were then cut or stamped out, and were made in one piece or in two or more pieces, the separate portions being afterward glued or pasted together, and finally provided with suitable button-holes.

We have heretofore alluded to the invention as particularly applicable to shirt-collars, but it is evident that it is equally well adapted to shirt-bosoms, wrist-bands, &c.

We claim as the invention of the said WALTER HUNT—

1. A shirt-collar composed of paper and muslin or its equivalent, so united that the muslin will counteract the fragile character of the paper.

2. A shirt-collar composed of paper and muslin or its equivalent, and polished or burnished, substantially as and for the purpose described.

In testimony whereof we have signed this specification in the presence of two subscribing witnesses.

UNION PAPER-COLLAR COMPANY,
By WILLIAM E. LOCKWOOD, *President.*

Witnesses:
WM. A. STEEL,
LOUIS BOSWELL.